United States Patent [19]

Kaneko

[11] 4,296,661
[45] Oct. 27, 1981

[54] FEED CONTROL FOR HORIZONTAL BANDSAW MACHINES

[75] Inventor: Tomonobu Kaneko, Isehara, Japan

[73] Assignee: Amada Company, Limited, Isehara, Japan

[21] Appl. No.: 32,924

[22] Filed: Apr. 24, 1979

[30] Foreign Application Priority Data

Apr. 28, 1978 [JP] Japan .................................. 53-50155
Apr. 28, 1978 [JP] Japan .................................. 53-50156

[51] Int. Cl.³ ...................... B23D 53/04; B27B 13/04
[52] U.S. Cl. ........................................ 83/796; 83/800; 83/801; 83/13
[58] Field of Search .................... 83/796, 800, 801, 13

[56] References Cited

U.S. PATENT DOCUMENTS 3,460,420  8/1969  Komendowski et al. ............. 83/801
3,465,628  9/1969  Komendowski et al. ............. 83/801
3,789,717  2/1974  Stolzer ................................. 83/796

*Primary Examiner*—Donald R. Schran
*Attorney, Agent, or Firm*—Thompson, Birch

[57] ABSTRACT

A feed control for a horizontal bandsaw machine has a hydraulic motor assembly which includes a piston dividing a hydraulic cylinder into upper and lower chambers. The cylinder is pivotally secured to the base of the machine, and the piston is pivotally secured to the saw head of the machine by an elongated piston rod. Hydraulic fluid is simultaneously introduced into one end of the motor assembly and withdrawn from the other end to positively regulate the position of the piston within the cylinder. A first pressure control device regulates the hydraulic pressure in the upper chamber of the motor assembly, and a second pressure control device regulates the hydraulic pressure in the lower chamber of the motor assembly. By regulating the pressure differential between the upper and the lower chambers, the rate of movement of the piston, and thus of the saw head, can be precisely regulated and thus optimized to insure cutting accuracy and minimize wear on the saw blade.

2 Claims, 4 Drawing Figures

FEED CONTROL FOR HORIZONTAL BANDSAW MACHINES

BACKGROUND OF THE INVENTION

1. Field of the Invention

The present invention relates generally to horizontal bandsaw machines in which a saw head assembly carrying a bandsaw blade is lowered during a cutting operation in order to feed the bandsaw blade into an underlying material to be cut, and more particularly pertains to a feed control for controlling the feeding of a bandsaw blade in horizontal bandsaw machines.

2. Description of the Prior Art

Horizontal bandsaw machines comprise a saw head assembly in which a flexible endless bandsaw blade is trained around a pair of wheels so that it may perform cutting operations when the wheels are power rotated. In most prevailing horizontal bandsaw machines, the saw head assembly is pivotally connected by a hinge pin to a base on which a material to be cut is placed, and it is so arranged as to be pivotally raised and lowered around the hinge pin by a piston rod of a hydraulic motor or cylinder. Thus, in cutting operations, the saw head assembly is swung down around the hinge pin from a raised position toward the base so as to feed the bandsaw blade travelling therein into the material to be cut which has been placed on the base. In this arrangement, the weight of the saw head assembly will act as a feeding force to feed the bandsaw blade into the material to be cut. In this connection, the saw head assembly can be so arranged as to be vertically raised and lowered along a guide post or posts, but in most cases it is pivotally hinged to the base in the above described manner mainly for reasons of manufacturing costs.

In such horizontal bandsaw machines, the feeding force of the bandsaw blade into the material to be cut has of course to be sufficient to cut hard and tough materials which are difficult to cut. An insufficient feeding force will cause the bandsaw blade to slide on the material to be cut without performing a cutting action and as a result the bandsaw blade will not only be uselessly worn but also will cause an undesirable work hardening of the material and a decrease in cutting accuracy.

The problem is that a feeding force sufficient to cut hard and tough difficult-to-cut materials is too great to cut normal easy-to-cut materials which are generally soft and brittle. An excessive feeding force will cause the blade to work too hard, and consequently the bandsaw blade will become worn prematurely and cutting accuracy will again be decreased.

For the above reasons, it is on one hand desired when cutting easy-to-cut materials to feed the bandsaw blade into the material with a smaller feeding force so that the cutting action may be performed always at a cerain optimum cutting rate which is defined as square millimeters of cut per unit of time. On the other hand, however, it is desired when cutting difficult-to-cut materials to feed the bandsaw blade into the materials with a greater feeding force. Accordingly, it is also desired in the horizontal bandsaw machines to control the feeding (force) of the bandsaw blade according to the materials to be cut, and it is of course necessary to keep the feeding force always fixed or unchanged until a cutting cycle has been completed on a material to be cut.

Heretofore, however, there have been vexing problems in controlling the feeding force of the bandsaw blade in horizontal bandsaw machines especially of the type in which the saw head assembly is pivotally raised and lowered around the hinge pin.

One of the vexing problems with regard to horizontal bandsaw machines has been the fact that the center of gravity of the saw head assembly will be rotatingly moved in its position with regard to a material to be cut to gradually change the moment as the saw head assembly is pivotally swung down around the hinge pin toward the material. Accordingly, the force component deriving from the weight of the saw head assembly and acting on the bandsaw blade to feed the same into the material to be cut will be always gradually changed during a cutting cycle as the saw head assembly is lowered from a raised position toward the material. In other words, the weight of the saw head assembly will not fully act on the bandsaw blade to feed the same into the material to be cut when the saw head assembly is at the most raised position, but it will act on the bandsaw blade more and more greatly as the saw head assembly is pivotally lowered toward the material around the hinge pin. Thus, with no additional arrangement, the feeding force of the bandsaw blade cannot be controlled so as to be kept unchanged and optimum according to materials to be cut in horizontal bandsaw machines of the type in which the saw head assembly is pivotally raised and lowered around the hinge pin.

As a conventional attempt to keep the feeding force unchanged in horizontal bandsaw machines, a helical spring has been so used as to be biased around the piston rod in the chamber of the hydraulic motor or cylinder for moving the saw head assembly in such a manner that it will be more strongly compressed when the saw head assembly is higher raised. In this arrangement, the helical spring will act on the bandsaw blade to feed the same into a material to be cut so as to compensate for the lack of the acting component of the saw head assembly when the saw head assembly is at its higher swung position. In this manner, however, it has been impossible to keep the feeding force constant during a cutting cycle, since springs have not only generally suffered from manufacturing errors in spring force but also the spring force is linearly changed in proportion to the compression of the spring while the acting component of the saw head assembly will be curvilinearly changed as the saw head assembly is pivotally swung down.

Another problem with regard to horizontal bandsaw machines has been that the feeding force of the bandsaw blade cannot be accurately controlled according to materials to be cut so as to feed the bandsaw blade into a material to be cut with an optimum feeding force. Although various attempts have been made to feed the bandsaw blade into a material to be cut with an optimum feeding force, there have been no horizontal bandsaw machines in which the feeding force can be accurately controlled according to whether a material to be cut is easy or difficult to cut. Generally, conventional bandsaw machines are so arranged that the feeding force can be controlled mainly when cutting easy-to-cut materials, and accordingly the feeding force cannot be accurately controlled when cutting difficult-to-cut materials.

SUMMARY OF THE INVENTION

It is a general object of the present invention to provide a feed control for horizontal bandsaw machines which will feed the bandsaw blade with a certain optimum feeding force during a cutting cycle so as to increase the life of the bandsaw blade and the cutting accuracy.

It is another object of the present invention to provide a feed control for horizontal bandsaw machines in which the feeding force of the bandsaw blade can be accurately controlled according to materials to be cut so as to increase the life of the bandsaw blade and the cutting accuracy.

In order to accomplish these objects, a horizontal bandsaw machine is provided with a double-acting hydraulic motor of a cylinder type which acts not only to raise the saw head assembly but also to positively lower the same to feed the bandsaw blade into a material to be cut. The upper chamber of the hydraulic motor where the hydraulic fluid acts to lower the saw head assembly is connected with a pressure control valve means which is controlled by a cam means to control the hydraulic pressure as the saw head assembly is pivotally lowered so that the feeding force may be kept always optimum. Also, the lower chamber of the hydraulic motor where the hydraulic fluid acts to raise the saw head assembly is connected, when the saw head assembly is to be lowered, to a flow control valve means and a pressure control valve means which are adjustable to control the feeding force according to materials to be cut.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENTS

Figure 1:
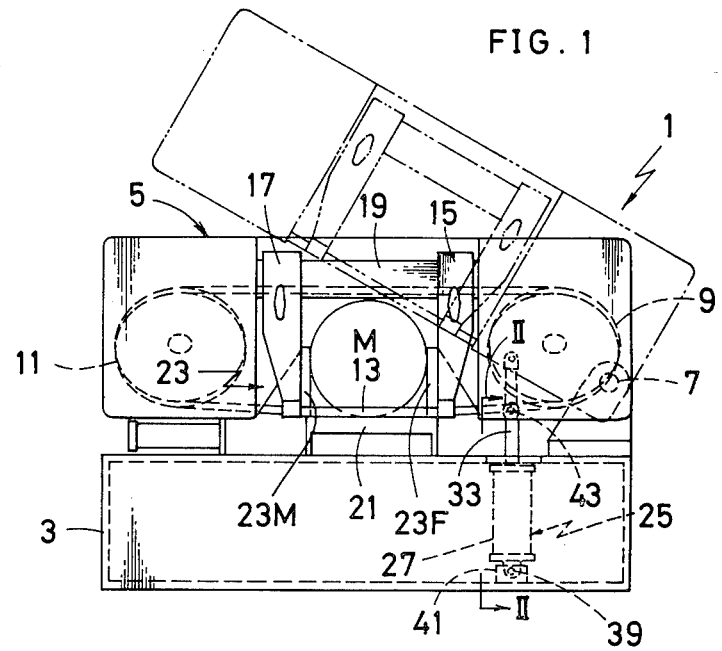
FIG. 1 is a front elevational view of a horizontal bandsaw machine embodying the principles of the present invention.

Referring now to FIG. 1, there is shown a horizontal bandsaw machine which is generally designated by the numeral 1 and which comprises a base 3 and a saw head assembly 5 which is pivotally connected to the base 3 by a hinge pin 7. The saw head assembly 5 includes therein a pair of wheels 9 and 11 around which an endless bandsaw blade 13 is trained so that it may be driven to make a cutting action when one of the wheels 9 and 11 is power driven. The bandsaw blade 13 is slidably held or guided with its cutting edge faced downwardly by a pair of guide arms 15 and 17 which are adjustably held by a beam member 19 fixed at the upper portion of the saw head assembly 5. A work-table 21 is mounted on the base 3 so that a material M to be cut may be placed thereon, and a vise assembly 23 having a fixed jaw 23F and a movable jaw 23M is also mounted on the base 3 to hold the material M to be cut therebetween. Thus, when the saw head assembly 5 is swung down around the hinge pin 7 from a raised position shown by the imaginary lines in FIG. 1, the bandsaw blade 13 rotating around the wheels 9 and 11 in the saw head assembly 5 will be fed to cut the material M held by the vise assembly 23 on the base 3.

Figure 2:
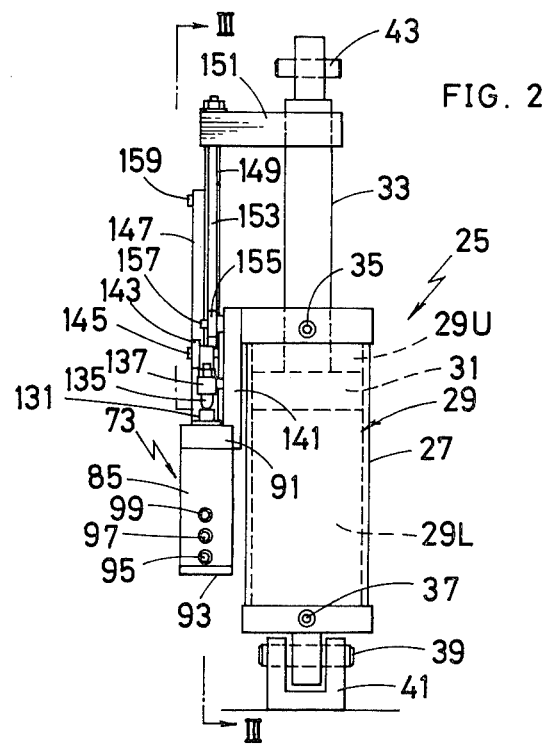
FIG. 2 is a partial view showing a portion of the horizontal bandsaw machine shown in FIG. 1 in section substantially taken along the line II—II of FIG. 1.

As seen from FIGS. 1 and 2, in order to raise and lower the saw head assembly 5 around the hinge pin 7, there is provided a hydraulic motor assembly 25 which is constructed of a hydraulic cylinder 27 having a chamber 29 where the hydraulic fluid acts. The hydraulic cylinder 27 of the hydraulic motor assembly 25 includes therein a piston 31 which has a piston rod 33 integrally fixed thereto and divides the chamber 29 into upper and lower chambers 29U and 29L having ports 35 and 37, respectively. The hydraulic motor assembly 25 is pivotally mounted by means of a pin 39 on a supporting member 41 which is mounted on a portion of the base 3, and the piston rod 33 of the hydraulic motor assembly 25 is pivotally connected to a portion of the saw head assembly 5 by means of a pin 43. Thus, when the lower chamber 29L of the hydraulic cylinder 27 is supplied with the hydraulic fluid from the port 37, the piston 31 will cause the piston rod 33 to raise or swing up the saw head assembly around the hinge pin 7 as shown by the imaginary lines in FIG. 1. Also, when the upper chamber 29U of the hydraulic cylinder 27 is supplied with the hydraulic fluid from the port 35, the piston 31 and the piston rod 33 will act to lower the saw head assembly 5 to feed the bandsaw blade 13 to cut the material M.

In this connection, however, it will be readily understood that the weight of the saw head assembly will largely act to feed the bandsaw blade 13 into the material M to be cut when the saw head assembly 5 is being lowered, whether or not the upper chamber 29U of the hydraulic cylinder 27 is supplied with the hydraulic fluid. Also, of course, when either of the chambers 29U and 29L is being supplied with the hydraulic fluid through the ports 35 or 37, the hydraulic fluid is exhausted from the other of the chambers 29U and 29L.

Figure 3A:
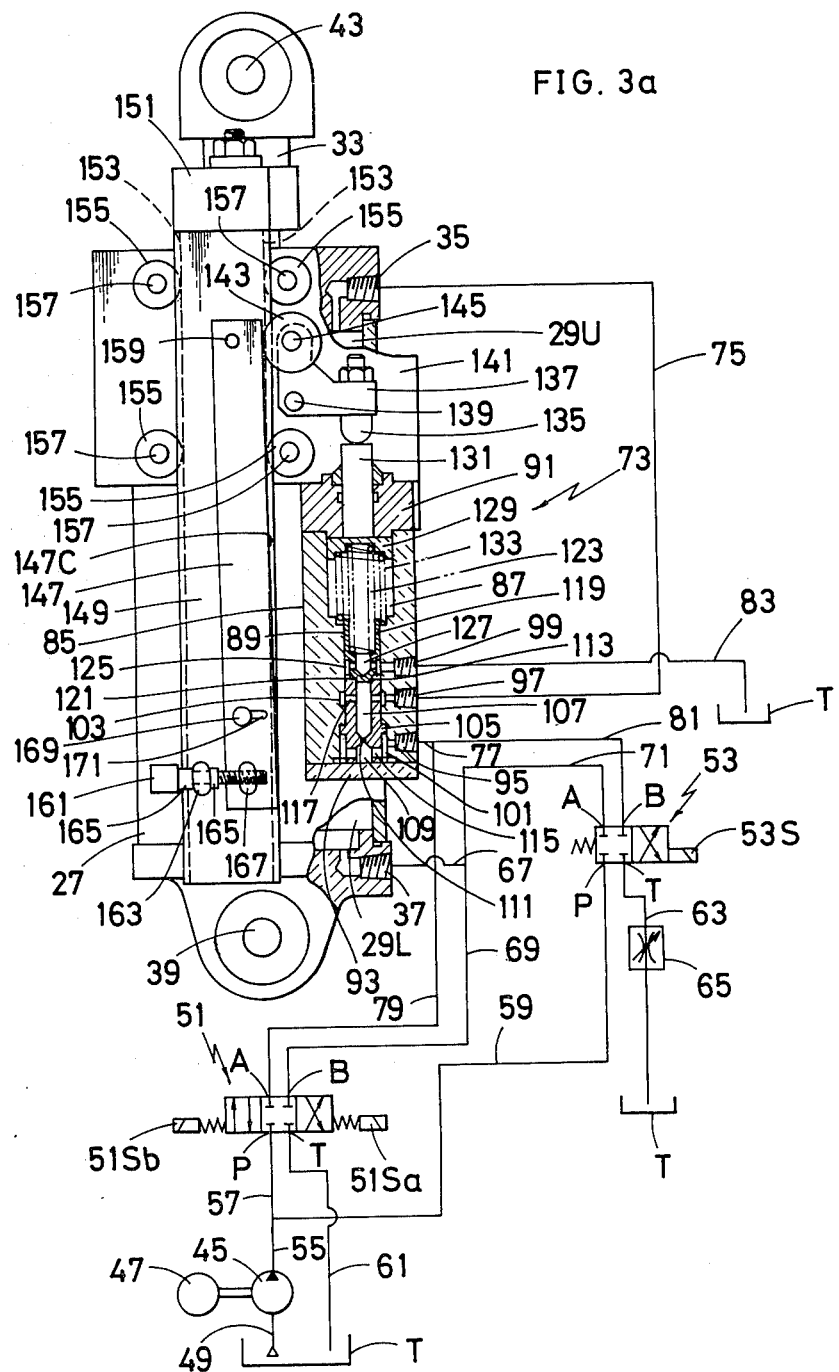
FIG. 3a is a schematic view showing an embodiment of the present invention partially in section substantially taken along the line III—III of FIG. 2.

As shown in FIG. 3a, the upper and lower chambers 29U and 29L of the hydraulic cylinder 27 are so arranged as to be supplied with the hydraulic fluid by a hydraulic pump 45 which is driven by a motor 47 and is connected with a hydraulic tank T through a conduit 49. In the preferred embodiment, the hydraulic pump 45 is connected to the upper and lower chambers 29U and 29L through two solenoid operated valve assemblies 51 and 53 so as to selectively deliver and exhaust the hydraulic fluid into and out of the upper and lower chambers 29U and 29L. The hydraulic pump 45 is connected with the solenoid operated valve assembly 51 by conduits 55 and 57 and with the solenoid operated valve assembly 53 by a conduit 59 which branches from the junction of the conduits 55 and 57. The solenoid operated valve assembly 51 is of a normally closed three position type having two solenoids 51Sa and 51Sb and four ports A, B, P and T, and it is so arranged that the ports A and B will be connected with the ports T and P, respectively, when the solenoid 51Sa is energized and the ports A and B will be connected with the ports P and T, respectively, when the solenoid 51Sb is energized. Also, in the solenoid operated valve assembly 51, the port P is connected with the conduit 57 and the port T is connected with a drain conduit 61 leading to the hydraulic tank T. The solenoid operated valve assembly 53 is of a normally closed two position type having a solenoid 53S and four ports A, B, P and T, and it is so arranged that the ports A and B will be connected with the ports T and P, respectively, when the solenoid 53S is energized. Also, the port T of the solenoid operated valve assembly 53 is connected to the hydraulic tank T by a drain conduit 63 where a flow control valve assembly 65 is provided.

The lower chamber 29L of the hydraulic cylinder 27 is connected from the port 37 to the port B of the solenoid operated valve assembly 51 by means of conduits 67 and 69, and it is also connected to the port A of the solenoid operated valve assembly 53 by a conduit 71 branching from the junction of the conduits 67 and 69. The upper chamber 29U of the hydraulic cylinder 27 is connected from the port 35 to the solenoid operated valve assemblies 51 and 53 through a pressure control valve assembly 73 which is secured to the hydraulic cylinder 27 and will be described hereinafter in great detail. It is to be noted here that the pressure control valve assembly 73 is connected to the port 35 of the upper chamber 29U by a conduit 75 and it is also connected to the port A of the solenoid operated valve assembly 51 by conduits 77 and 79 and to the port B of the solenoid operated valve assembly 53 by a conduit 81 branching from the junction of the conduits 77 and 79. Also, the pressure control valve assembly 73 is directly connected to the hydraulic tank T by a drain conduit 83 to partially drain the hydraulic fluid thereinto as will be described hereinafter in great detail.

As is now readily understood from the above description, the hydraulic fluid is delivered into the lower chamber 29L of the hydraulic cylinder 27 from the hydraulic tank T by the pump 45 through the solenoid operated valve assembly 51 so as to raise the saw head assembly 5 when the solenoid 51Sa of the solenoid operated valve assembly 51 is energized. When the hydraulic fluid is being delivered into the lower chamber 29L of the hydraulic cylinder 27, the hydraulic fluid in the upper chamber 29U of the same will be drained to the hydraulic tank T through the solenoid operated valve assembly 51 and the drain conduit 61 and also through the drain conduit 83 after having been sent into the pressure control valve assembly 51 via the conduit 75.

As is also readily understood, the hydraulic fluid will be delivered into the upper chamber 29U of the hydraulic cylinder 27 by the pump 45 through either of the solenoid operated valve assemblies 51 and 53 to lower the saw head assembly 5 when either of the solenoids 51Sb and 53S of the solenoid operated valve assemblies 51 and 53, respectively, is energized. Of course, when the hydraulic fluid is being delivered into the upper chamber 29U of the hydraulic cylinder 27, the hydraulic fluid in the lower chamber 29L of the hydraulic cylinder 27 is discharged therefrom through either of the solenoid operated valve assemblies 51 and 53 kept energized so that the saw head assembly 5 may be lowered. In this connection, when either of the solenoid operated valve assemblies 51 and 53 is kept energized to enable the hydraulic fluid to flow therethrough, the other of them is kept closed to prevent the hydraulic fluid from flowing therethrough. In this arrangement, when the saw head assembly 5 is to be lowered to perform a cutting operation, the solenoid operated valve assembly 53 is energized to drain the hydraulic fluid therefrom to the hydraulic tank T through the flow control valve assembly 65 under a flow control so as to feed the bandsaw blade 13 at an optimum feeding speed. Also, when the saw head assembly 5 is to be lowered for some purposes other than cutting operation, the solenoid 51Sb of the solenoid operated valve assembly 51 is energized to rapidly lower the saw head assembly 5.

Referring again to FIG. 3a, the pressure control valve assembly 73 is constructed of an elongate casing 85 which has chambers 87 and 89 and is closed at its ends by cap members 91 and 93. The chambers 87 and 89 are preferably cylindrical in shape and the chamber 87 is formed larger in diameter but shorter in length than the chamber 89, and they are connected or open to each other. The casing 85 is provided with a port 95 connecting with the conduit 77, a port 97 connecting with the conduit 75 and another port 99 connecting with the conduit 83 at intervals in order from the end having the cap member 93 toward the other end in such a manner that they radially open into the chamber 89. Also, the chamber 89 is formed at its cylindrical wall with annular grooves 101 and 103 which are hydraulically connected with the ports 95 and 97, respectively.

In the pressure control valve assembly 73, an elongate valve block 105 shorter than the chamber 89 is fixedly and tightly put in the chamber 89 in close vicinity to or in abutment with the cap member 93 in such a manner as to reduce the vacant portion of the chamber 89 without closing the port 99. The valve block 105 is provided at its axial center with an elongate chamber 107 opening to the chamber 89 and another chamber 109 connected with the chamber 107 by an orifice 111, and is also formed at its end with a valve seat 113 neighboring the port 99 and being preferably conical in shape. Furthermore, the valve block 105 is provided with a plurality of radial passages 115 connecting the chamber 109 and the annular groove 101 and another plurality of radial passages 117 connecting the chamber 107 and the annular groove 103. Thus, the hydraulic fluid sent into the port 95 from the conduit 77 will flow into the chamber 107 via the annular groove 101, the radial passages 115 and the orifice 111 and then flow through the radial passages 117 and the annular groove 103 to exit the port 97 and lead to the upper chamber 29U of the hydraulic cylinder 27 and the hydraulic fluid discharged from the upper chamber 29U will flow in the reverse direction, as long as the valve seat is kept closed. In this connection, it will be understood by those skilled in the art that the orifice 111 can be omitted to form the chambers 107 and 109 as a single chamber if a restricting means is provided in the conduit 77.

In order to control the hydraulic pressure in the chamber 107 of the pressure control valve assembly 73, a spool member 119 having a valve member 121 facing the valve seat 113 is slidably inserted in the chamber 89 and is biased by a spring 123 against the valve seat 113. The valve member 121 is formed smaller in diameter than the chamber 89 so as to provide an annular cavity 125 surrounding the valve member 113 and connecting with the port 99, and the spool member 119 is formed with ports 127 connecting the annular cavity 125 and the chamber 87 in the preferred embodiment. The spring 123 is so arranged as to be adjustably biased against the spool member 119 by a slidable spring seat member 129 slidable in the chamber 87 and having a rod member 131 which is so disposed as to slidably project out of the cap member 91. Also, in order to bias the spring seat member 129 to the cap member 91, there is provided another spring 133 between the spring seat member 129 and the shoulder of the chamber 87, although of course the spring seat member 129 is also biased against the cap member 91 by the spring 123.

In the above described arrangement, the hydraulic fluid prevailing in the chamber 107 will act to push the valve member 121 against the spring 123, and it will flow through between the valve member 121 and the valve seat 113 to drain to the hydraulic tank T through the annular cavity 125, the port 99 and the conduit 83 when the hydraulic pressure in the chamber 107 exceeds the biasing force of the spring 123. Thus, the hydraulic pressure in the chamber 107 is controlled when the pushing rod member 131 is pushed to adjust the spring force of the spring 123 biasing the valve member 121 to the valve seat 113. Also, the hydraulic pressure in the upper chamber 29U of the hydraulic cylinder 27, which acts to lower the saw head assembly 5 to feed the bandsaw blade 13, is simultaneously controlled when the hydraulic pressure in the chamber 107 is controlled since the chambers 29U and 107 are directly connected with each other by the conduit 75.

As shown in FIGS. 2 and 3a, in order to adjust the biasing force of the spring 123 of the pressure control valve assembly 73, there is provided a pushing member 135 which is held in contact with the top of the rod member 131 by a bell crank means 137 so as to adjustably push the rod member 131. The bell crank means 137 is pivotally supported by a pin 139 fixed to a supporting plate member 141 which is secured to the upper portion of the hydraulic cylinder 27, and the bell crank means 137 with a roller 143 rotatably pivoted thereto by a shaft 145. In the preferred embodiment, the bell crank means 137 is so disposed as to push the rod member 131 to compress the spring 123 when swung around the pin 139 clockwise in FIG. 3a and release the same when swung counterclockwise. Also, the bell crank means 137 is so arranged as to swung around the pin 139 by an elongate cam plate 147 having a cam 147C which is provided in contact with the roller 143 to push the same.

The cam plate 147 is fixed to an elongate plate member 149 which is held in parallel with the piston rod 33 of the hydraulic motor assembly 25 by a supporting member 151 fixed to the upper portion of the piston rod 33 so as to move therewith. The plate member 149 carrying the cam plate 147 is formed at its opposite side with guide grooves 153, and it is so disposed as to be guided by a plurality of rollers 155 each having a shaft 157 which are rotatably mounted in engagement with the guide grooves 153 on the supporting plate member 141 fixed to the hydraulic cylinder 27. Thus, the plate member 149 will be moved between the rollers 155 together with the piston rod 33 to raise and lower the cam plate 147 when the piston rod 33 is moved to raise and lower the saw head assembly 5. As a matter of great importance, the cam plate 147 is mounted on the plate member 149 in such a manner that the cam 147C is slanted or inclined at a certain degree in a direction away from the roller 143 of the bell crank means 137. Also, the cam plate 147 may be pivotally mounted on the plate member 149 by means of a pin 159 so that it may be adjustably inclined at an optimum degree by an adjusting bolt 161, which is held by a holding member 163 locked by nuts 165 and engages with a nut 167 connected to the cam plate 147, and may be fixed by a bolt 169 provided through a slot 171 formed on the cam plate 147.

In the above described arrangement, the cam 147C of the cam plate 147 will act to push the roller 143 of the bell crank means 137 rotatable around the pin 139 to cause the push member 135 to push the rod member 131 of the pressure control valve assembly 73 so as to ultimately control the hydraulic pressure in the upper chamber 29U of the hydraulic cylinder 27 as a function of the position of the piston 31 and piston rod 33. The cam 147C of the cam plate 147 will act to push the rod member 131 farthest when it is at a higher position together with the piston rod 33 and it will gradually push the rod member 131 less as it is lowered by the piston rod 33, since it is inclined in a direction away from the roller 143. As is readily apparent, the hydraulic pressure in the upper chamber 29U of the hydraulic cylinder 27 will be increased when the rod member 131 is pushed furthest in to compress the spring 123 of the pressure control valve assembly 73 and it will be reduced when the rod member 131 is not pushed in as far. From the above description, it will now be understood that the pressure control valve assembly 73 controlled by the cam 147C of the cam plate 147 will increase the hydraulic pressure in the upper chamber 29U of the hydraulic cylinder 27 when the saw head assembly 5 is at a raised position and it will gradually reduce the same as the saw head assembly 5 is lowered so that the bandsaw blade 13 may be fed always with a fixed feeding force into the material to be cut.

Figure 3B:
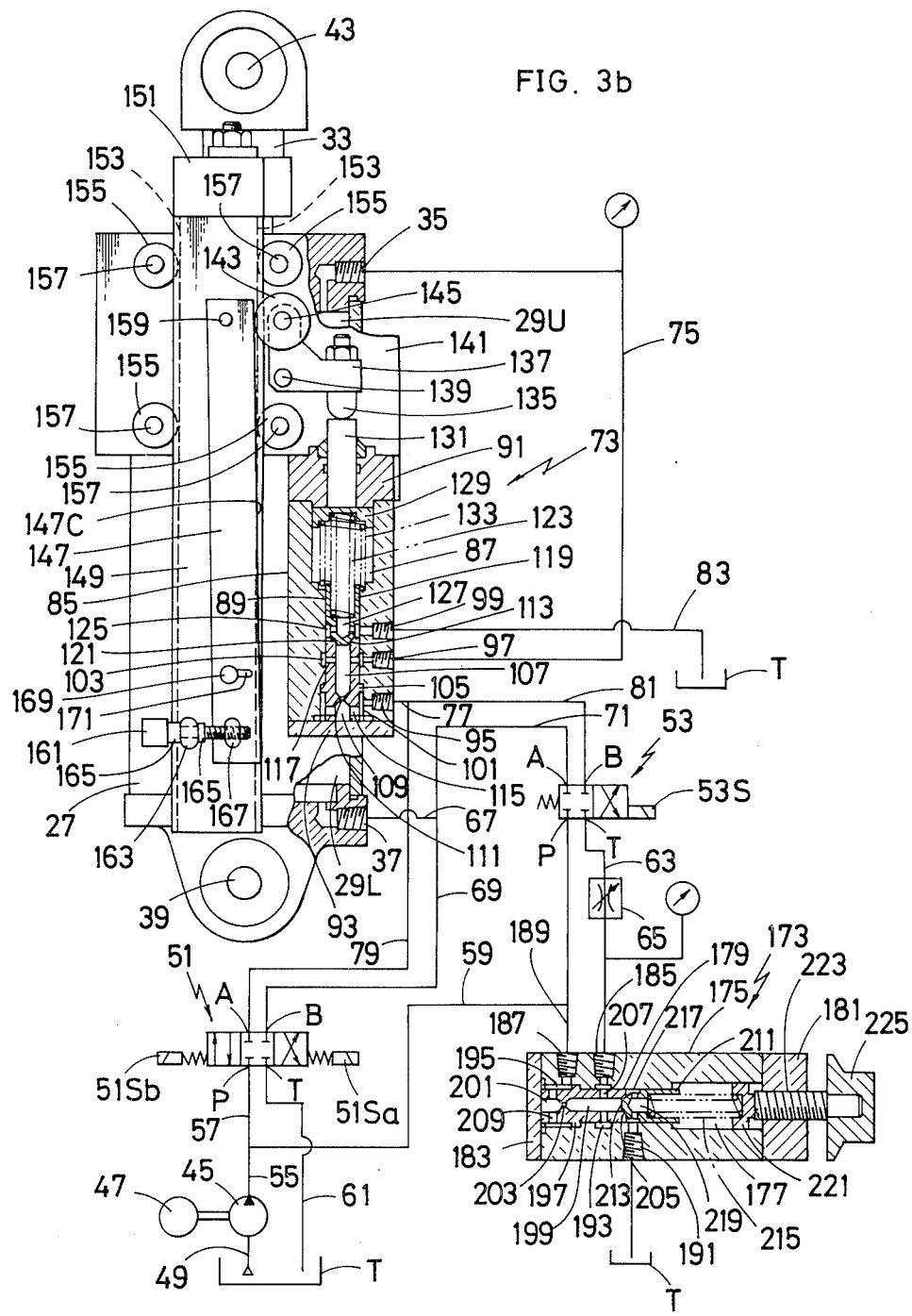
FIG. 3b is a schematic view showing another embodiment of the present invention partially in section substantially taken along the line III—III of FIG. 2.

Referring now to FIG. 3b, another pressure control valve 173, which is almost the same in construction and function as the pressure control valve assembly 73, can be provided at the drain conduit 63 down the flow control valve assembly 65 in order to control the hydraulic pressure in the lower chamber 29L of the hydraulic cylinder 27.

The second pressure control valve assembly 173 is constructed of an elongate casing 175 which has chambers 177 and 179 which are formed connected or open to each other and is closed at its ends by cap members 181 and 183. The casing 175 is provided with a port 185 connecting with the conduit 65, a port 187 connected with the conduit 59 by a conduit 189 and another port 191 leading to the hydraulic tank T in such a manner that they are radially open into the chamber 179. Also, the chamber 179 is formed at its cylindrical wall with annular grooves 193 and 195 which are hydraulically connected with the ports 185 and 187, respectively, and it has an elongate valve block 197 fixed and tightly fitted between the cap member 183 and the port 191. The valve block 197 is provided at its axial center with elongate chambers 199 and 201 connected with each other by an orifice 203 and is formed at its end with a valve seat 205 neighboring the port 191, and furthermore it is provided with a plurality of radial passages 207 connecting the chamber 199 and the annular groove 193 and another plurality of radial passages 209 connecting the chamber 201 and the annular groove 195.

In order to control the hydraulic pressure in the chamber 199 of the pressure control valve assembly 173, a spool member 211 having a valve member 213 facing the valve seat 205 is slidably inserted in the chamber 179 and is biased by a spring 215 to the valve seat 205. The valve member 213 is formed smaller in diameter than the chamber 179 so as to provide an annular cavity 217 connecting with the port 191, and the spool member 211 is formed with ports 219 connecting the annular cavity 217 and the chamber 177 in the preferred embodiment. The spring 215 is so arranged as to be adjustably biased to the spool member 211 by a slidable spring seat member 221 connected to an adjusting screw 223 which projects out of the cap member 181 and is provided with a knob 225.

In the above described arrangement, the hydraulic pressure acting in the lower chamber 29L of the hydraulic cylinder 27 can be controlled by adjusting the knob 225 of the second pressure control valve assembly 173 when the saw head assembly 5 is lowered to feed the bandsaw blade 13 into the material M to be cut. As is readily apparent, the hydraulic pressure in the lower chamber 29L of the hydraulic cylinder 27 will be increased when the knob 225 is tightened to compress the spring 215 to the valve seat 205 and it will be reduced when the knob 225 is released.

As is apparent, the hydraulic pressure in the lower chamber 29L of the hydraulic cylinder 27 will act to resist and reduce the feeding force put forth by the gravity of the saw head assembly 5 and the hydraulic pressure of the upper chamber 29U of the hydraulic cylinder 27. Accordingly, the effective feeding force of the bandsaw blade 13 can be controlled by controlling the hydraulic pressure in the lower chamber 29L of the hydraulic cylinder 27, although the saw head assembly 5 is lowered with a fixed feeding force under the control by the control valve assembly 73. Thus, the feeding force can be adjusted according to materials to be cut by operating the second pressure control valve assembly 173 to change the hydraulic pressure of the lower chamber 29L of the hydraulic cylinder 27. In operation, the feeding force of the bandsaw blade 13 is increased by reducing the pressure in the lower chamber 29L of the hydraulic cylinder 27 when cutting difficult-to-cut materials, and the feeding force is reduced by increasing the pressure in the lower chamber 29L when cutting normal easy-to-cut materials in order to feed the bandsaw blade 13 at an optimum cutting rate.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. In a horizontal bandsaw machine having a hydraulic piston-cylinder unit for pivotally operating a cutting head assembly relative to a fixed base, wherein the flow of hydraulic fluid bled from unit during a cutting operation is controlled by a valve which is adjusted in response to movement of a cam follower along an inclined cam surface, the improvement comprising: the cam surface and the cam follower being connected respectively to the piston and cylinder of said unit in a manner such that axial movement of said piston relative to said cylinder will produce corresponding movement of said cam surface relative to said cam follower.

2. The bandsaw machine of claim 1 further comprising means for adjustably altering the inclination of said cam surface relative to the direction of piston movement to achieve an optimum setting for the cutting operation being performed.

* * * * *